April 1, 1924.

F. O. WELLS

DIE HOLDER

Filed Feb. 21, 1922

1,488,770

INVENTOR,
Frank O. Wells,
BY
Harry W. Bowen.
ATTORNEY.

Patented Apr. 1, 1924.

1,488,770

UNITED STATES PATENT OFFICE.

FRANK O. WELLS, OF GREENFIELD, MASSACHUSETTS.

DIE HOLDER.

Application filed February 21, 1922. Serial No. 538,226.

*To all whom it may concern:*

Be it known that I, FRANK O. WELLS, a citizen of the United States of America, residing at Greenfield, in the county of Franklin and State of Massachusetts, have invented certain new and useful Improvements in Die Holders, of which the following is a specification.

This invention relates to improvements in metal thread cutting tools, and more particularly to the construction of die holders or collet members and the plates for retaining the die members in place when in use.

Heretofore it has been a common practice to form the collet by casting, and then cutting a thread on its inner surface or periphery to receive a threaded die clamping member. This process, or method, is objectionable as it requires further operations to finish the same before it is ready to receive the dies.

An object of the present improvement is to form or produce the collet member by the stamping or power press process. This process is less expensive and the article after it leaves the press is substantially in a finished or completed condition and ready to receive the dies, with the exception of minor operations, as forming the threaded openings which receive the machine screw that serve to retain the die clamping plate in place as will be fully described and pointed out in the claims.

Referring to the drawings.

Figure 1:
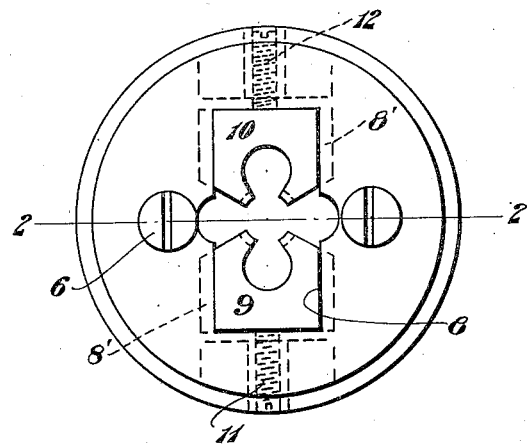
Fig. 1 is a plan view of the upper surface or end of the collet member with the dies therein and the plate for clamping the dies in place.
Figure 2:
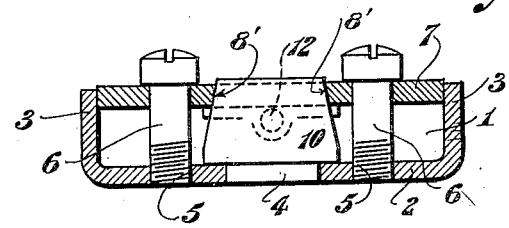
Fig. 2 is a vertical sectional view on the line 2—2 of Fig. 1 showing the plate retaining screws, the plate and an edge view of one of the dies in place.

Referring to the drawings in detail:

1 designates the cup-shaped collet member, having the bottom portion 2 and the side or edge portion 3. The bottom or base portion is formed with an opening 4 through which the member extends on which a thread is being cut in the usual manner. This part of the cup-shaped member is also formed with the threaded openings 5 to receive the threaded end of the plate clamping screws 6.

The follower or die clamping plate is indicated at 7 and is designed to have a close fit within the sides 3 of the collet member 1, as shown.

This plate is formed with the rectangular shaped opening 8 with the inclined sides 8' to receive the upper portions of the inclined edges of the thread cutting dies 9 and 10.

11 and 12 indicate the usual adjusting screws for moving the dies towards each other in order to cut the correct size thread.

The collet member 1 is formed by the die stamping process, or drop forging the same. The openings 4 and 5 can, of course, be formed at the same time that the stamping is done. The die clamping plate 7 with the opening 8 is preferably formed by stamping or drop forging. By forming the members 1 and 7 of the collet by stamping or by the forging process, they are very much improved over the old process of casting, and the resulting cost is very much lessened.

It will be noticed that the member 1 is substantially a cup or U-shaped piece. It is to be understood that the collet member 1 of the holder is formed by suitably shaped dies and punches without illustrating process.

What I claim is:

1. In a die holder, the combination with a circular cup-shaped collet member which is formed from a single piece of suitable material, of a slidable die clamping follower plate which is of a diameter substantially equal to the internal diameter of the said member, and means for securing the plate to the collet member for clamping the dies between the collet member and the follower plate.

2. In a die holder, the combination with a cup-shaped collet member, a die clamping follower plate located within the sides of the cup-shaped member and of a diameter substantially equal to the internal diameter of the collet member, and means for securing the plate to the collet member for clamping the dies between the collet member and the follower plate, said means including threaded openings in the collet member and openings in the plate to receive the securing means.

3. In a die and collet construction, the combination, of a single cup-shaped member, dies in said member, of means for adjusting the dies towards each other, a die clamping follower plate formed with an opening with inclined sides to receive the opposite sides of the dies, and means between the plate and the cup-shaped member for moving the plate against the dies and into the cup-shaped member, as described.

4. In a die and collet construction, the combination, of a single cup-shaped member formed with threaded openings, dies located in the said member, of set screws for moving the dies towards each other, a die clamping follower plate formed with an opening to receive the opposite sides of the dies, and other openings therein, clamping means extending between the plate and the cup-shaped member for moving the plate against the dies and into the cup-shaped member, said means comprising screws in the openings of the plate and entering the threaded openings in the member.

5. A die holder comprising in combination, with a cup-shaped one piece collet member, dies located on the bottom of the member, a plate having an opening with inclined sides to engage the outer side portions of the dies to retain the dies in place in said member, clamping means for moving the plate into the member against the dies and into the cup-shaped member, as described, and set screws for moving the dies in said member.

6. A die holder comprising an integral cup-shaped member formed with threaded openings in its bottom portion and a centrally disposed opening to receive the article upon which a thread is to be cut, thread cutting dies located in the holder, a follower plate formed with a rectangular shaped opening therethrough; the longer or side edges of which opening are inclined from the upper surface downward to its lower surface to engage the thread cutting-dies which are formed with correspondingly shaped inclined side surfaces; the follower plate being located within the cup-shaped member, and having openings therethrough, clamping screws passing through the openings in the said plate and threaded into the threaded openings in the bottom portion of the cup-shaped member to draw the inclined side edges of the rectangular shaped opening against the inclined edges of the said dies to clamp the same in the cup-shaped member.

FRANK O. WELLS.